Patented July 3, 1951

2,558,992

UNITED STATES PATENT OFFICE 2,558,992

COLORED NYLON ARTICLE AND METHOD OF MANUFACTURE

Louis L. Stott, Reading, Pa., assignor to The Polymer Corporation, Reading, Pa., a corporation of Pennsylvania No Drawing. Application March 25, 1947, Serial No. 737,103

7 Claims. (Cl. 18—47.5)

1

This invention relates to articles formed of synthetic linear polyamide materials, which are commonly known to the trade as nylon, the invention being especially concerned with colored nylon articles and with a method for manufacturing such colored nylon articles. Typical of such polyamides are polyhexamethylene adipamide and polyhexamethylene sebacamide.

The invention is of special utility in the case of articles of "irregular section," this expression ("irregular section") being used herein to refer to an article of such shape that in different portions thereof or along different axes thereof the article is of different thickness. A typical example of such an article is a molded comb, frequently having both fine and heavy teeth, in addition to a base part from which the teeth project. In such an article the base part is relatively thick as compared with the teeth and, similarly, the heavy teeth are relatively thick as compared with the fine teeth. There are many other articles of irregular section which are advantageously made of the synthetic linear polyamides.

For many purposes it is of advantage to provide colored articles of the type mentioned. However, certain special problems arise with reference to the coloring of articles made of synthetic linear polyamides, especially where the articles are of irregular section. Such articles may be stained, as by application of an organic dye material to the surface of the article, which results in coloring of a thin surface layer of the article. Pleasing effects may be secured in this way in the case of articles of regular section, for instance, a tumbler having a cylindrical wall and bottom of substantially uniform thickness throughout. The staining of such an article of uniform thickness or regular section results in a substantially uniform color effect throughout the entire article.

However, the staining technique referred to, when applied to an article of irregular section results in a nonuniform color effect as between portions of the article of different thickness or section. Apparently the nonuniformity arises as a result of the fact that the polyamide material is more or less translucent or even transparent, so that the color effect observed by the eye is at least in large part due to the transmission of light through the article, the thinner the section the larger the amount of light transmitted therethrough. In consequence, in the case of an article of irregular section such as a comb, with uniform staining throughout the surface layer

2 of all parts of the article, the effect to the eye is that the fine teeth are of a dark shade, the heavy teeth of an intermediate shade, and the base part of a very light shade.

The present invention achieves a uniform color effect, even with light or pastel shades, such as pale blues, pinks, etc.

According to the invention the polyamide material from which such articles are to be formed is rendered substantially opaque by the incorporation and dispersion therein of an opaque pigment material, preferably either white or of light shade of some color. A typical example of such a pigment is titanium dioxide.

After formation of the article from the opaque polyamide material, for instance, by injection molding, the surface layer of the article is colored by application of an appropriate organic dye, for instance the blue, 1,4-dimethylamino anthraquinone. In an article produced in this way the effect to the eye is substantially completely the result of light reflected from the article, rather than transmitted through any portion thereof. The color effect to the eye is therefore uniform throughout the entire surface area of the article, regardless of the thickness or section of different portions thereof.

With respect to the technique above described several important factors should be kept in mind. In the first place, many of the dye materials which are applicable to the staining or dyeing of the high melting polyamides are organic compounds having decomposition temperatures below the melting point of these polyamides. For this reason it is impracticable to disperse or dissolve such dye materials throughout a mass or body of such polyamide material by heating the polyamide to render it molten or liquid, or to mechanically disperse dyes in the high melting polyamides and then mold or extrude the material. For example, with the polyamide formed as the reaction product of polyhexamethylene diamine and adipic acid, which is a typical polyamide of the type in question, the melting point lies at about 507° F. In molding or extruding this material localized heating in excess of 600° F. may readily be reached. Such temperatures are considerably in excess of the decomposition point of most organic dyes.

In addition, it should be kept in mind that when in the molten state the polyamide materials are rather highly reactive and from this standpoint also it is undesirable to introduce certain materials which would react in a manner to impair the desired physical properties or chemical characteristics of the material itself. Thus, it is of advantage according to the invention that the coloring be effected by surface staining, for instance, by dipping (or soaking) the article in solutions or suspensions of the organic dye, preferably at temperatures elevated above room temperature according to techniques well known in the textile dyeing industry.

Pigment materials of the type contemplated for use to impart substantial opacity to the polyamide material are in general inorganic compounds having decomposition points above the melting point of the polyamide, preferably above 600° F., and preferably also being substantially inert with respect to the polyamide. Pigment materials of this type may readily be dispersed in the polyamide by melting the polyamide, or be physically mixed and subsequently further dispersed during a molding or extrusion operation. The quantity of the pigment material added, however, should not be too much to seriously impair the characteristic strength and toughness of the polyamide. Moreover, even small percentages serve the purpose of imparting opacity to the articles, a suitable range being from a minor fractional percentage, such as .25%, up to 4%. For maximum assurance against impairment of physical properties the quantity of pigment should be kept below 2%.

In addition to titanium dioxide referred to above as a typical example of inorganic pigment material, a variety of other materials may be used, especially light colored metal oxides, such as zinc oxide, aluminum oxide, and magnesium oxide.

Among the organic dyes which may be used for staining the polyamide formed from the reaction product of polyhexamethylene diamine and adipic acid are the following organic materials:

Azo dyes, such as:
Aniline→phenyl methyl pyrazalone
Beta naphthylamine→2-napthol 3,6-disulphonic acid
5-nitro-2-amino anisole→dimethyl aniline Anthraquinone dyes, such as:

2-methyl amino anthraquinone
1,4-dimethylamino anthraquinone
1 (2-sulfo-4-methyl-1-phenyl), 4-hydroxy anthraquinone For many purposes, and especially where pastel or light shades of color are desired, the invention contemplates the employment of a white pigment material dispersed in the polyamide, followed by staining of the completed article with the desired dye, since entirely uniform and especially pleasing color effects can be achieved in this way. In some instances, however, it may be desirable to incorporate a colored pigment such as lead chromate ($PbCrO_4$) and then dye the filled polyamide to get special color effects.

I claim:

1. An article of irregular section formed of a synthetic linear polyamide, said article having pigment material dispersed therein and imparting substantial opacity thereto, and the article further having colored dye material in a shallow surface layer thereof.

2. An article according to claim 1 in which said pigment material is titanium dioxide.

3. An article of irregular section formed of a synthetic linear polyamide, said article having dispersed therein up to about 4% of a pigment material imparting substantial opacity to the article, and the article further having colored dye material in a shallow surface layer thereof.

4. An article of irregular section formed of a synthetic linear polyamide, said article having a light colored metal oxide dispersed therein and imparting substantial opacity thereto, and the article further having colored dye material in a shallow surface layer thereof.

5. A method for making a colored article of irregular section from a synthetic linear polyamide, which method comprises uniformly dispersing pigment material capable of withstanding temperatures of 600° F. without decomposition throughout the mass of a batch of the polyamide from which the article is to be formed, whereby to impart substantial opacity to the article, and, after formation of the article, uniformly dyeing a shallow surface layer thereof with a colored dye.

6. A method for making a colored article of irregular section from a synthetic linear polyamide, which method comprises uniformly dispersing up to 4% of a light colored metal oxide capable of withstanding temperatures of 600° F. without decomposition throughout the mass of a batch of the polyamide from which the article is to be formed, whereby to impart substantial opacity to the article, and, after formation of the article, uniformly dyeing a shallow surface layer thereof by immersion of the article in an aqueous solution of an organic dye.

7. An article of irregular section formed of a synthetic linear polyamide, said article having pigment material dispersed therein and imparting substantial opacity thereto, and the article further having colored dye material in a shallow surface layer thereof extended substantially throughout the surface of the article and providing, in combination with the opaque pigmentation, a uniformly colored effect substantially throughout the surface of the article.

LOUIS L. STOTT.

REFERENCES CITED

The following references are of record in the file of this patent:

UNITED STATES PATENTS

| Number | Name | Date |
|---|---|---|
| 2,128,533 | Howald | Aug. 30, 1938 |
| 2,208,494 | Broderson | July 16, 1940 |
| 2,292,905 | Smith | Aug. 11, 1942 |
| 2,326,531 | Gates | Aug. 10, 1943 |
| 2,345,533 | Graves | Mar. 28, 1944 |